United States Patent
Sim

(10) Patent No.: US 10,414,360 B2
(45) Date of Patent: Sep. 17, 2019

(54) APPARATUS AND METHOD FOR CONTROLLING CURRENT CONSUMPTION OF AUTOMOTIVE ELECTRONIC SYSTEM

(71) Applicant: MANDO CORPORATION, Gyeonggi-do (KR)

(72) Inventor: Gyung Hun Sim, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 157 days.

(21) Appl. No.: 15/820,297

(22) Filed: Nov. 21, 2017

(65) Prior Publication Data
US 2018/0141507 A1 May 24, 2018

(30) Foreign Application Priority Data
Nov. 23, 2016 (KR) .................. 10-2016-0156702

(51) Int. Cl.
*B60R 16/033* (2006.01)
*B60R 16/03* (2006.01)

(52) U.S. Cl.
CPC ............ *B60R 16/033* (2013.01); *B60R 16/03* (2013.01)

(58) Field of Classification Search
CPC .......................... B60R 16/033; B60R 16/03
See application file for complete search history.

(56) References Cited

U.S. PATENT DOCUMENTS

2014/0265559 A1* 9/2014 Leehey .................. B60L 58/13
307/10.1

\* cited by examiner

*Primary Examiner* — Robert L Deberadinis
(74) *Attorney, Agent, or Firm* — Ladas & Parry, LLP

(57) ABSTRACT

Disclosed are an apparatus and a method for controlling current consumption of an automotive electronic system, which determine a behavior of a vehicle, according to priorities when danger is detected while the vehicle is traveling, the apparatus including a first determiner configured to determine whether the sum of currents consumed in first to third automotive electronic systems exceeds a first critical current; and a controller configured to limit a current supplied to an automotive electronic system having the lowest priority among the first to third automotive electronic systems when the sum of the currents consumed in the first to third automotive electronic systems exceeds the first critical current.

13 Claims, 2 Drawing Sheets

APPARATUS AND METHOD FOR CONTROLLING CURRENT CONSUMPTION OF AUTOMOTIVE ELECTRONIC SYSTEM

CROSS-REFERENCE TO RELATED APPLICATION

This application claims priority to and the benefit of Korean Patent Application No. 10-2016-0156702, filed on Nov. 23, 2016, the disclosure of which is incorporated herein by reference in its entirety.

BACKGROUND

1. Field of the Invention

The present disclosure relates to an apparatus and a method for controlling current consumption of an automotive electronic system.

2. Discussion of Related Art

Generally, a plurality of electronic systems, such as audio equipment, an air conditioner, a windshield wiper, and the like, are provided in a vehicle, and these electronic systems are driven by receiving power from a battery of the vehicle.

Meanwhile, as such electronic systems are electronics, power consumption increases.

Specifically, a braking system, a steering system, and a suspension system among the plurality of electronic systems have higher current consumption than other electronic systems (e.g., audio equipment, a heater, a windshield wiper, and the like) in the vehicle.

More specifically, a braking system maximally consumes about 100 $A_{rms}$ of current, a steering system maximally consumes about 95 $A_{rms}$ of current, and suspension devices installed at front and rear wheels maximally consume 100 $A_{rms}$ and 80 $A_{rms}$ of current, respectively.

At this point, when a danger is detected while the vehicle is traveling, all of the braking system, the steering system, and the suspension system may be driven, and, in this case, current consumption of each of these electronic systems may reach their maximum current consumptions.

Accordingly, a current suppliable to other electronic systems (e.g., the audio equipment, the heater, the windshield wiper, and the like) of the vehicle may be reduced due to a limited battery capacity such that the driving of the braking system, the steering system and the suspension system may be stopped, and, when a voltage drop occurs due to the maximum current consumption of the braking system, the steering system, and the suspension system, and a voltage drops below a normal operating voltage of an electronic control unit (ECU) due to such a voltage drop, all electronic systems of the vehicle may be shut down.

Specifically, when the braking system and the steering system are shut down in a situation in which there is a risk of a vehicle collision, safety of a driver cannot be ensured.

SUMMARY OF THE INVENTION

Therefore, it is one objective of the present disclosure to provide an apparatus and a method for controlling current consumption of an automotive electronic system which are capable of preventing a shutdown of all electronic systems of a vehicle due to a voltage dropping below a normal operating voltage of an electronic control unit (ECU) dropping when danger is detected while the vehicle is traveling.

Also, it is another objective of the present disclosure to provide an apparatus and a method for controlling current consumption of an automotive electronic system which are capable of preventing stoppage of a braking system and a steering system to achieve safety of a driver in the event of a dangerous situation when a dangerous situation is detected while a vehicle is traveling.

Further, it is still another objective of the present disclosure to provide an apparatus and a method for controlling current consumption of an automotive electronic system which are capable of improving energy supply efficiency and effectively controlling current consumption required for normal driving of a braking system.

According to one aspect of the present disclosure, there is provided an apparatus for controlling current consumption of first, second, and third automotive electronic systems, which determine a behavior of a vehicle, according to priorities when danger is detected while the vehicle is traveling, the apparatus including a first determiner configured to determine whether the sum of currents consumed in the first to third automotive electronic systems exceeds a first critical current; and a controller configured to limit a current supplied to an automotive electronic system having the lowest priority among the first to third automotive electronic systems when the sum of the currents consumed in the first to third automotive electronic systems exceeds the first critical current.

The first automotive electronic system may be a braking system, the second automotive electronic system may be a steering system, and the third automotive electronic system may be a suspension system.

Priorities of the first to third automotive electronic system may decrease in an order of the braking system, the steering system, and the suspension system.

The controller may limit the current consumed in the suspension system to a value obtained by subtracting currents consumed in the braking system and the steering system from the first critical current.

The first critical current may be a maximum allowable current of a battery which is suppliable to the braking system, the steering system, and the suspension system.

The apparatus may further include a second determiner configured to determine whether the limited current consumed in the suspension system exceeds a second critical current.

The second critical current may be a minimum allowable current required for driving the suspension system.

When the limited current consumed in the suspension system exceeds a second critical current, the controller may block the limited current supplied to the suspension system.

Further, according to another aspect of the present disclosure, there is provided a method for controlling current consumption of a braking system, a steering system, and a suspension system, which determine a behavior of a vehicle, according to priorities when danger is detected while the vehicle is traveling, the method including determining whether the sum of currents consumed in the braking system, the steering system, and the suspension system exceeds a first critical current; and, when the sum of the currents consumed in the braking system, the steering system, and the suspension system exceeds the first critical current, limiting a current supplied to a suspension system having the lowest priority among the braking system, the steering system, and the suspension system, wherein, the current consumed in the suspension system is limited to a value obtained by subtracting the currents consumed in the braking system and the steering system from the first critical current.

The first critical current may be a maximum allowable current of a battery which is suppliable to the braking system, the steering system, and the suspension system.

The method may further include determining whether the limited current consumed in the suspension system exceeds a second critical current.

The second critical current may be a minimum allowable current required for driving the suspension system.

The method may further include, when the limited current consumed in the suspension system exceeds a second critical current, blocking the limited current supplied to the suspension system.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EXEMPLARY EMBODIMENTS

Figure 1:
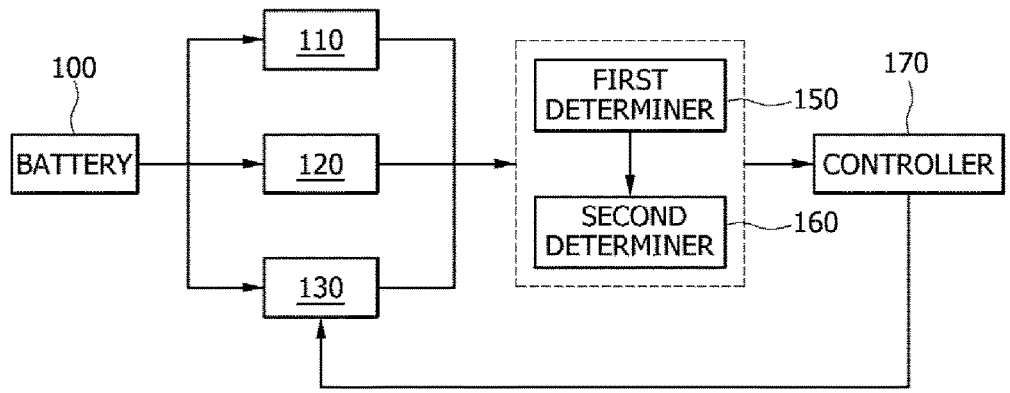
FIG. 1 is a schematic block diagram of an apparatus for controlling current consumption of an automotive electronic system according to an embodiment of the present disclosure.

Hereinafter, embodiments of the present disclosure will be fully described in detail which is suitable for easy implementation by those skilled in the art with reference to the accompanying drawings. The present disclosure may be implemented in various different forms, and thus it is not limited to embodiments which will be described herein. In the drawings, some portions not related to the description will be omitted and not shown to clearly describe the present disclosure, and the same reference numerals will be given to the same or similar components throughout the disclosure.

It should be understood that the terms of "comprise" and "have" specify the presence of stated herein features, numbers, steps, operations, components, elements, or a combination thereof, but do not preclude the presence or possibility of addition of one or more another features, numbers, steps, operations, components, elements, or a combination thereof.

Figure 2:
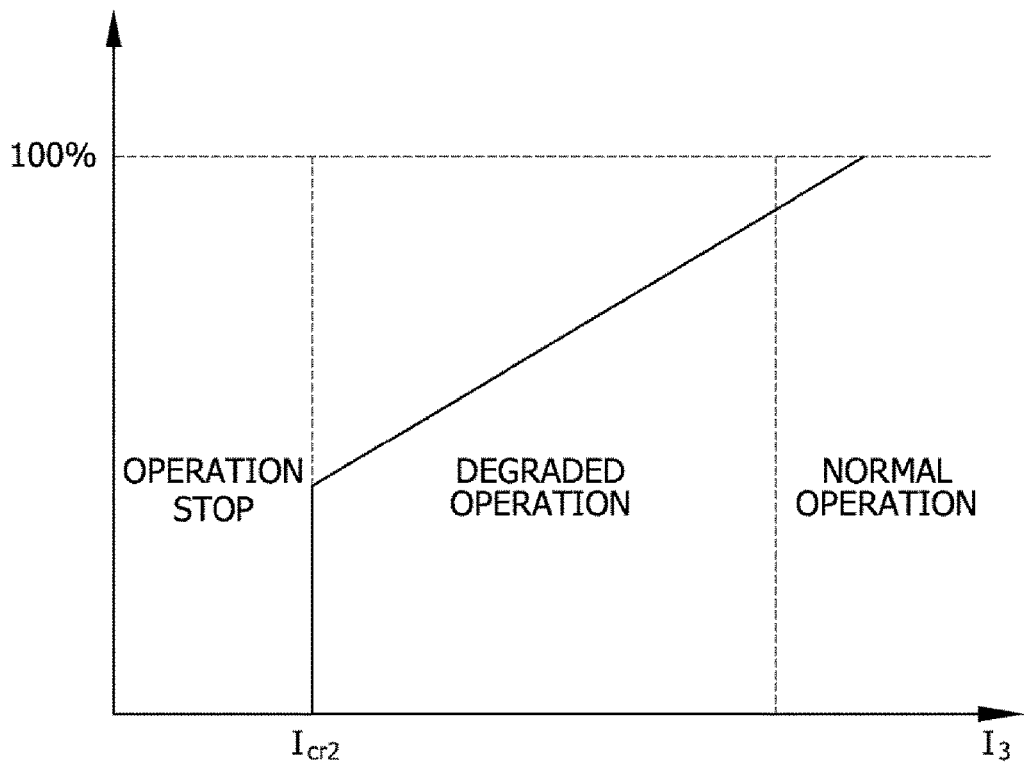
FIG. 2 is a graph for describing a method for controlling current consumption of an automotive electronic system according to an embodiment of the present disclosure.

FIG. 1 is a schematic block diagram of an apparatus for controlling current consumption of an automotive electronic system according to an embodiment of the present disclosure. Further, FIG. 2 is a graph for describing a method for controlling current consumption of an automotive electronic system according to an embodiment of the present disclosure.

As shown in FIG. 1, the apparatus for controlling current consumption of an automotive electronic system according to an embodiment of the present disclosure is an apparatus for controlling current consumption of first, second, and third electronic systems configured to determine a behavior of a vehicle according to a priority of danger when danger is sensed while the vehicle is traveling, and includes a first determiner 150, a second determiner 160, and a controller 170.

Here, the first electronic system may be a braking system 110, the second electronic system may be a steering system 120, and the third electronic system may be a suspension system 130, but the systems are not limited thereto.

Hereinafter, an example in which the first, second, and third electronic systems are the braking system 110, the steering system 120, and the suspension system 130, respectively, will be described.

When a danger of collision is detected in front of a vehicle through various sensors (not shown) mounted on the vehicle while the vehicle is traveling, an electronic system having the highest priority is the braking system 110 for reducing a vehicle speed or stopping the vehicle to avoid the danger, an electronic system having the next priority is the steering system 120 for changing a direction in which the vehicle is traveling, and an electronic system having the lowest priority is the suspension system 130 for controlling an attitude of the vehicle.

That is, when danger is detected while the vehicle is traveling, the priority of the electronic system decreases in the order of the braking system 110, the steering system 120, and the suspension system 130. Specifically, the suspension system 130 is an electronic system for ride comfort of a driver and has a priority that is significantly lower than those of the braking system 110 and the steering system 120.

Meanwhile, current consumption of each of the braking system 110, the steering system 120, and the suspension system 130 is higher than those of other electronic systems (e.g., audio equipment, a heater, a windshield wiper, and the like) of the vehicle, and specifically, when danger is sensed while the vehicle is traveling, all of the braking system 110, the steering system 120, and the suspension system 130 may be driven, and in this case, the current consumption of each of these electronic systems 110, 120, and 130 may be maximized.

Accordingly, a current suppliable to the other electronic systems (e.g., the audio equipment, the heater, the windshield wiper, and the like) of the vehicle may be reduced due to a limited capacity of a battery 100 such that the driving of the braking system 110, the steering system 120, and the suspension system 130 may be stopped, and, when a voltage drop occurs due to maximum current consumption of the braking system 110, the steering system 120, and the suspension system 130 and a voltage drops below a normal operating voltage of an electronic control unit (ECU) due to such a voltage drop, all of the electronic systems of the vehicle may be shut down.

Specifically, when the braking system 110 and the steering system 120 are shut down in the event of the possibility of danger of a vehicle collision, safety of the driver cannot be ensured.

At this point, the apparatus for controlling current consumption of an electronic system according to the embodiment of the present disclosure limits the current consumption of the suspension system 130 having the lowest priority when danger is detected while the vehicle is traveling, thereby securing current consumption required for the braking system 110 and the steering system 120 which have relatively high priorities.

To this end, the first determiner 150 determines whether the sum of currents $I_1$, $I_2$, and $I_3$ consumed in the braking system 110, the steering system 120, and the suspension system 130, respectively, exceeds a first critical current $I_{Cr1}$.

At this point, when the sum of the currents $I_1$, $I_2$, and $I_3$ consumed in the braking system 110, the steering system 120 and the suspension system 130, respectively, does not exceed the first critical current $I_{Cr1}$, since the battery 100 having a limited capacity may supply a current required for normally driving each of the electronic systems, there is no need to limit the current consumption of the suspension system 130.

Here, the first critical current $I_{Cr1}$ may be the maximum allowable current of the battery 100 which is suppliable to the braking system 110, the steering system 120, and the suspension system 130. That is, the first critical current $I_{Cr1}$ may be the remaining current of the limited suppliable current of the battery 100 except for a current required for normally driving other electronic systems (e.g., the audio equipment, the heater, the windshield wiper, and the like).

Further, when the sum of the currents $I_1$, $I_2$, and $I_3$ consumed in the braking system 110, the steering system 120, and the suspension system 130 exceeds the first critical current $I_{Cr1}$ (i.e., $(I_1+I_2+I_3)>I_{Cr1}$), the controller 170 limits the current $I_3$ having the lowest priority which is supplied to and consumed in the suspension system 130. In the worst case, the controller 170 may block the current $I_3$ that is supplied to the suspension system 130.

Here, the controller 170 may limit the current $I_3$ consumed in the suspension system 130 to a value obtained by subtracting the currents $I_1$ and $I_2$, which are consumed in the braking system 110 and the steering system 120, from the first critical current $I_{Cr1}$ (i.e., $I_3=I_{Cr1}-I_1-I_2$).

Accordingly, as the currents $I_1$ and $I_2$ consumed in the braking system 110 and the steering system 120 increase, the current $I_3$ supplied to the suspension system 130 decreases.

As described above, when danger is detected while the vehicle is traveling, the current $I_3$ consumed in the suspension system 130 having the lowest priority is limited such that shutdown of all of the electronic systems of the vehicle in addition to the braking system 110, the steering system 120, the suspension system 130 can be prevented.

Specifically, the currents $I_1$ and $I_2$ required for normally driving the braking system 110 and the steering system 120 are secured by limiting the current $I_3$ consumed in the suspension system 130 which is not related to the safety of the driver such that stoppage of the braking system 110 and the steering system 120 is prevented, and thus safety of the driver can be achieved during a dangerous situation.

The second determiner 160 determines whether the limited current $I_3$ consumed in the suspension system 130 exceeds a second critical current $I_{Cr2}$. Here, the second critical current $I_{Cr2}$ may be a minimum allowable current required for operation of the suspension system 130.

When the limited current $I_3$ consumed in the limited suspension system 130 exceeds the second critical current $I_{Cr2}$, the controller 170 blocks the current $I_3$ supplied to the suspension system 130.

More specifically, as shown in FIG. 2, the operation of the suspension system 130 may be classified into a normal operation section, a degraded operation section, and an operation stop section according to the current $I_3$ supplied to the suspension system 130.

Here, the normal operation section may be a section in which the current $I_3$ is supplied to the suspension system 130 such that the suspension system 130 is able to operate in a performance range of 80% to 100%, the degraded operation section may a section in which a current $I_3$ is supplied to the suspension system 130 such that the suspension system 130 is able to operate in a performance range of 40% to 80%, and the operation stop section may be a section in which a current $I_3$ is supplied to the suspension system 130 such that the suspension system 130 is able to operate in a performance range of 0% to 40%.

Meanwhile, performance of the suspension system 130 deteriorates as the current $I_3$ supplied to the suspension system 130 decreases.

Here, when an inoperable level of the current $I_3$ is supplied to the suspension system 130, the controller 170 blocks the current $I_3$ supplied to the suspension system 130.

That is, the controller 170 reduces the current $I_3$ supplied to the suspension system 130 (in the degraded operation section), and, when the second determiner 160 determines that the reduced current $I_3$ is supplied at less than the critical current $I_{Cr2}$, which is a minimum allowable current required for operation of the suspension system 130, the controller 170 blocks the reduced current $I_3$ supplied to the suspension system 130 (in the operation stop section).

In this way, when the performance of the suspension system 130 is degraded below a predetermined level, the current $I_3$ supplied to the suspension system 130 is blocked such that a current corresponding to the current $I_3$ may be supplied to the braking system 110 and the steering system 120, and through such control, a current required for normally driving the braking system 110 and the steering system 120 can be further secured during a dangerous situation.

Figure 3:
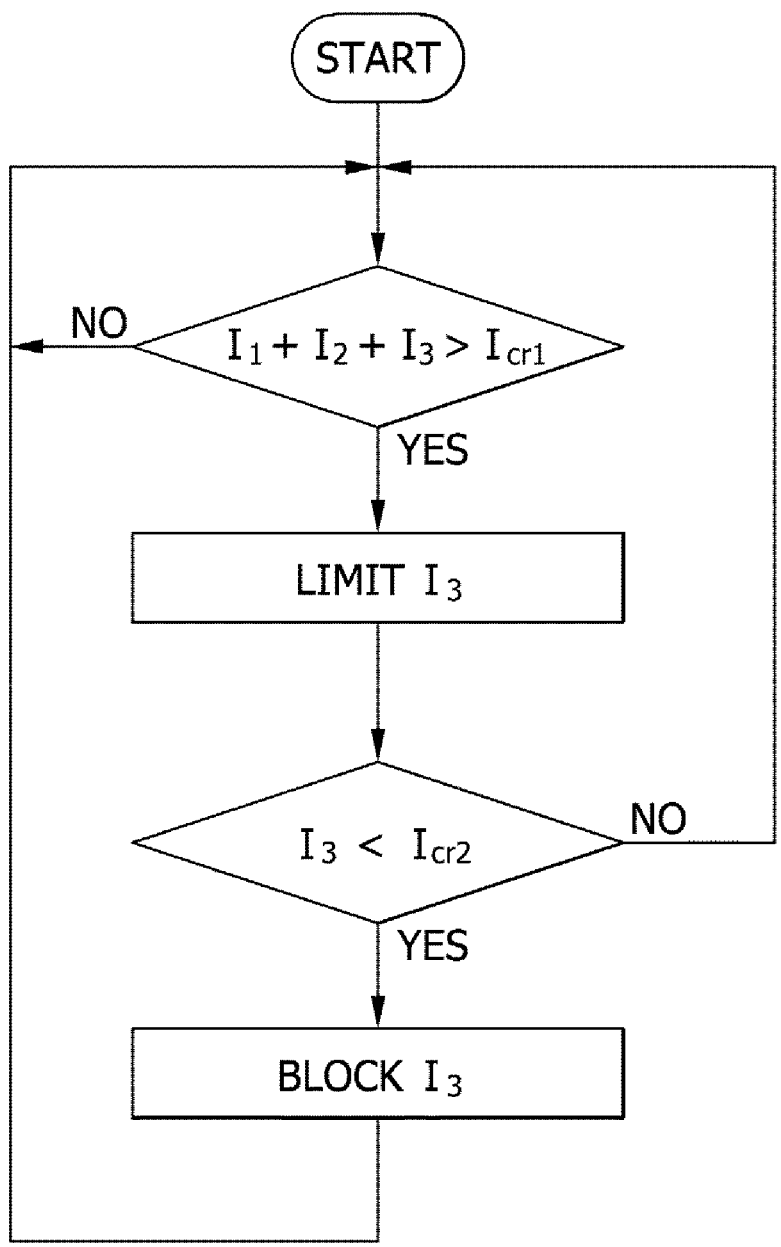
FIG. 3 is a flowchart of the method for controlling current consumption of an automotive electronic system according to the embodiment of the present disclosure.

FIG. 3 is a flowchart of the method for controlling current consumption of an automotive electronic system according to the embodiment of the present disclosure.

Hereinafter, the method for controlling current consumption of an automotive electronic system according to the present disclosure will be described with reference to FIGS. 1 to 3, and a description identical to that of the above-described apparatus for controlling current consumption of an automotive electronic system will be omitted.

As shown in FIG. 3, the method for controlling current consumption of an automotive electronic system according to the embodiment of the present disclosure includes determining whether the sum of the currents $I_1$, $I_2$, and $I_3$, which are consumed in the braking system 110, the steering system 120, and the suspension system 130, exceeds the first critical current $I_{Cr1}$, and, when the sum of the currents $I_1$, $I_2$, and $I_3$, which are consumed in the braking system 110, the steering system 120, and the suspension system 130, exceeds the first critical current $I_{Cr1}$, limiting the current $I_3$ supplied to the suspension system 130 having the lowest priority among the braking system 110, the steering system 120, and the suspension system 130.

At this point, when the sum of the currents $I_1$, $I_2$, and $I_3$ consumed in the braking system 110, the steering system 120 and the suspension system 130, respectively, does not exceed the first critical current $I_{Cr1}$, since the battery 100 having a limited capacity may supply a current required for normally driving each of the electronic systems, there is no need to limit the current consumption of the suspension system 130.

Here, the first critical current $I_{Cr1}$ may be the maximum allowable current of the battery 100 which is suppliable to the braking system 110, the steering system 120, and the suspension system 130. That is, the first critical current $I_{Cr1}$ may be the remaining current of the limited suppliable current of the battery 100 except for a current required for normally driving the other electronic systems (e.g., the audio equipment, the heater, the windshield wiper, and the like).

Here, the current $I_3$ consumed in the suspension system 130 may be limited to a value obtained by subtracting the currents $I_1$ and $I_2$, which are consumed in the braking system 110 and the steering system 120, from the first critical current $I_{Cr1}$ (i.e., $I_3=I_{Cr1}-I_1-I_2$).

As described above, when danger is detected while the vehicle is traveling, the current $I_3$ consumed in the suspension system 130 having the lowest priority is limited such that shutdown of all of the electronic systems of the vehicle in addition to the braking system 110, the steering system 120, and the suspension system 130 can be prevented.

Specifically, the currents $I_1$ and $I_2$ required for normally driving the braking system 110 and the steering system 120 are secured by limiting the current $I_3$ consumed in the suspension system 130, which is not related to the safety of the driver, such that stoppage of the braking system 110 and the steering system 120 is prevented, and thus safety of the driver can be achieved during a dangerous situation.

In addition, the method for controlling current consumption of an automotive electronic system according to the embodiment of the present disclosure may further include determining whether the limited current $I_3$ consumed in the suspension system 130 exceeds the second critical current $I_{Cr2}$.

Here, the second critical current $I_{Cr2}$ may be a minimum allowable current required for operation of the suspension system 130.

Also, the method may further include, when the limited current $I_3$ consumed in the suspension system 130 exceeds the second critical current $I_{Cr2}$, blocking the current $I_3$ supplied to the suspension system 130.

More specifically, as shown in FIG. 2, the operation of the suspension system 130 may be classified into the normal operation section, the degraded operation section, and the operation stop section according to the current $I_3$ supplied to the suspension system 130.

Meanwhile, the performance of the suspension system 130 deteriorates as the current $I_3$ supplied to the suspension system 130 decreases.

Here, when an inoperable level of the current $I_3$ is supplied to the suspension system 130, the current $I_3$ supplied to the suspension system 130 is blocked.

That is, the current $I_3$ supplied to the suspension system 130 is reduced (in the degraded operation section), and, when it is determined that the reduced current $I_3$ is supplied at less than the critical current $I_{Cr2}$, which is a minimum allowable current required for operation of the suspension system 130, the reduced current $I_3$ supplied to the suspension system 130 is blocked (in the operation stop section).

In this way, when the performance of the suspension system 130 is degraded below a predetermined level, the current $I_3$ supplied to the suspension system 130 is blocked such that a current corresponding to the current $I_3$ may be supplied to the braking system 110 and the steering system 120, and through such control, a current required for normally driving the braking system 110 and the steering system 120 can be further secured during dangerous situation.

In accordance with the present disclosure, when danger is detected while a vehicle is traveling, shutdown of all electronic systems of the vehicle due to a voltage dropping below a normal operating voltage of an ECU can be prevented.

Further, in accordance with the present disclosure, when danger is detected while a vehicle is traveling, currents required for normally driving a braking system and a steering system can be secured by limiting a current consumed in a suspension system, which is not related to safety of a driver, such that stoppage of the braking system and the steering system can be prevented and the safety of the driver can be achieved during a dangerous situation.

Furthermore, in accordance with the present disclosure, a current unnecessary for the suspension system can be supplied to the braking system and the steering system or to other electronic systems of the vehicle such that energy supply efficiency can be improved.

In addition, in accordance with the present disclosure, when wheel slippage of the braking system occurs, a current consumed in the braking system increases until wheel locking of the braking system occurs such that a current required for normally driving the braking system can be effectively controlled.

Although one embodiment of the present disclosure has been described above, the spirit of the present disclosure is not limited to the embodiment disclosed herein, and those skilled in the art should understand that numerous other embodiments that will fall within the same spirit and scope of this disclosure can be devised through addition, modification, deletion, supplement, and the like of a component, and also that these other embodiments fall within the spirit and scope of the present disclosure.

What is claimed is:

1. An apparatus for controlling current consumption of first, second, and third automotive electronic systems, which determine a behavior of a vehicle, according to priorities when danger is detected while the vehicle is traveling, the apparatus comprising:
   a first determiner configured to determine whether the sum of currents consumed in the first to third automotive electronic systems exceeds a first critical current; and
   a controller configured to limit a current supplied to an automotive electronic system having the lowest priority among the first to third automotive electronic systems when the sum of the currents consumed in the first to third automotive electronic systems exceeds the first critical current.

2. The apparatus of claim 1, wherein the first automotive electronic system is a braking system, the second automotive electronic system is a steering system, and the third automotive electronic system is a suspension system.

3. The apparatus of claim 2, wherein priorities of the first to third automotive electronic systems decrease in an order of the braking system, the steering system, and the suspension system.

4. The apparatus of claim 2, wherein the controller limits the current consumed in the suspension system to a value obtained by subtracting currents consumed in the braking system and the steering system from the first critical current.

5. The apparatus of claim 2, wherein the first critical current is a maximum allowable current of a battery which is suppliable to the braking system, the steering system, and the suspension system.

6. The apparatus of claim 4, further comprising a second determiner configured to determine whether the limited current consumed in the suspension system exceeds a second critical current.

7. The apparatus of claim 6, wherein the second critical current is a minimum allowable current required for driving the suspension system.

8. The apparatus of claim 6, wherein, when the limited current consumed in the suspension system exceeds the second critical current, the controller blocks the limited current supplied to the suspension system.

9. A method for controlling current consumption of a braking system, a steering system, and a suspension system, which determine a behavior of a vehicle, according to priorities when danger is detected while the vehicle is traveling, the method comprising:

determining whether the sum of currents consumed in the braking system, the steering system, and the suspension system exceeds a first critical current; and when the sum of the currents consumed in the braking system, the steering system, and the suspension system exceeds the first critical current, limiting a current supplied to a suspension system having the lowest priority among the braking system, the steering system, and the suspension system, wherein, the current consumed in the suspension system is limited to a value obtained by subtracting the currents consumed in the braking system and the steering system from the first critical current.

10. The method of claim 9, wherein the first critical current is a maximum allowable current of a battery which is suppliable to the braking system, the steering system, and the suspension system.

11. The method of claim 9, further comprising determining whether the limited current consumed in the suspension system exceeds a second critical current.

12. The method of claim 11, wherein the second critical current is a minimum allowable current required for driving the suspension system.

13. The method of claim 11, further comprising, when the limited current consumed in the suspension system exceeds a second critical current, blocking the limited current supplied to the suspension system.

\* \* \* \* \*